United States Patent Office 2,961,434
Patented Nov. 22, 1960

2,961,434

ELIMINATION OF BAGGING DURING OLEFIN POLYMERIZATION

John R. Skinner, Oakland, Calif., and Robert van Helden, Amstelveen, Netherlands, assignors to Shell Oil Company, New York, N.Y., a corporation of Delaware No Drawing. Filed Oct. 31, 1957, Ser. No. 693,523

10 Claims. (Cl. 260—93.7)

This invention relates to the polymerization of olefins. More particularly it relates to improvements in the "low pressure" methods for the polymerization of alpha-olefins as ethylene, propylene and the like.

It is now known that alpha-olefins may be polymerized to produce a polymer which is characterized by a high content of crystalline polymer. The crystalline polymer, which is referred to sometimes as isotactic polymer, is useful for moldings, surface coatings, fibre forming, and the like, and is obtained by the so-called "low pressure methods." Such methods are characterized by conducting the polymerization at temperatures ranging from about 20° C. to about 150° C. and pressures less than 500 p.s.i.g. The crystalline polymer is obtained when the polymerization is effected in the presence of polymerization catalysts which are commonly "low pressure catalysts." The low pressure catalysts are now well known in the art and are represented by, for example, those selected from groups A and B as follows:

A. The reaction product of (1) a compound of a metal selected from groups IV, V, VI and VIII of the periodic table and manganese with (2) a compound of the formula $R_1R_2AlX$ wherein $R_1$ and $R_2$ each are selected from the group consisting of hydrogen and hydrocarbon and X is selected from the group consisting of hydrogen, halogen, alkoxy, aryloxy, the residue of a secondary amine, amide, mercaptan, thiophenol, carboxylic acid and sulfonic acid, B. The reaction product of (1) a compound of a metal from groups IV, V, VI and VIII of the periodic table and manganese with (2) a compound selected from the group consisting of aluminum trialkyl, magnesium alkyl, zinc alkyl and Grignard compound.

Actually the low pressure polymerization methods represent a fairly recent advance in the art and there are presently numerous problems associated with the methods which must be overcome before low pressure polymers can be produced on a commercial scale. One such problem is that the polymer, particularly the crystalline polypropylene, has heretofore had a strong tendency to adhere to the inner surfaces of the polymerization vessel irrespective of the materials of construction of the vessel. This adhesion took place on the walls of the reactor as well as on the blades and the shaft of the agitator within the reactor. Since the polymerization requires means to control the temperature the reactor is normally equipped with heating and cooling means such as heating coils within the reactor. When such coils are employed in the reactor adhesion took place there also. This phenomenon has come to be called "bagging" and the polymer which thus adheres to the inner surfaces of the vessel is called "the bag." It will be readily apparent that bagging cannot be tolerated in commercial operations for numerous reasons. For one thing the clean-up operation becomes so time-consuming so as to seriously limit production capacity. Further, continuous operations, which are most preferred, were not feasible because bagging in the transfer lines prevented the normal movement of slurries or solutions of the polymer. In any event, whether batch or continuous operations are employed the initial period of agitation was ineffective because the bag reduces the effective agitation of the agitator. These disadvantages, and others which are caused by bagging during olefin polymerizations, are obviated by the present invention.

It is an object of this invention to provide improved processes for the low pressure polymerization of alpha-olefins using the low pressure methods. It is another object of this invention to provide processes for the production of low pressure polymers of alpha-olefins whereby bagging, and the problems associated therewith, are eliminated. It is a particular object of this invention to provide processes for the low pressure polymerization of propylene, by the continuous method, whereby bagging is completely eliminated. Other objects of this invention will become apparent as the description of the invention proceeds.

These and other objects are accomplished in the process for the polymerization of alpha-olefins at temperatures below 150° C. and pressures below 500 p.s.i.g. in the presence of a low pressure polymerization catalyst by the improvement which comprises initially maintaining the reactor substantially saturated with alpha-olefin and heating the reaction mixture to the reaction temperature so that temperature differentials within the reactor are less than about 20° C. By following this procedure the polymer bag, which is characteristic of prior art procedures, is eliminated and the polymerization takes place in a homogeneous system. While the processes of this invention may be applied to the low pressure processes for the polymerizing of any alpha-olefin, it is particularly suited to the polymerization of propylene because bagging is most severe in that case and has heretofore not been overcome. In the case of, for example, low pressure polymerization of ethylene, styrene, and the like, bagging is considerably less severe in addition to which other means are available to reduce or eliminate bagging. Such other means are not suitable in the case of propylene polymerization although the present methods are equally adaptable to the polymerization of alpha-olefins in general. Further, the processes of this invention are suitable for the production of copolymers prepared from two or more alpha-olefins. This invention will be described in detail as it relates mainly to propylene polymerization but it will be understood that other alpha-olefins will behave in the same manner.

The operability of this invention is in no way dependent on such factors as the polymerization temperatures, pressures, solvents, catalysts or proportion of the various ingredients used. This is supported by numerous experiments which were conducted to investigate the cause of bagging with the object of solving the aforementioned problem. From those experiments possible causes of bagging were formulated and are offered here but it should be understood that this invention is in no way limited by theoretical considerations.

Heretofore, the procedure for effecting polymerization of propylene by the low pressure methods was to charge the catalyst and solvent in measured amounts to the reactor, heat to the desired reaction temperature and then pressure up to the desired operating pressure with monomer. Alternatively it was convenient to add the propylene in the liquid form since it would be easily metered to the reactor. Thereafter the temperature was raised quickly to the reaction temperature because the reaction is exothermic and temperature control was facilitated if the reaction were permitted to go to the desired reaction temperature as quickly as possible. Furthermore no reason was seen why the reaction should be made to proceed slowly. By these prior art procedures it is believed that initially there are sufficient centers formed to initiate the polymerization but insufficient propylene is present to accommodate these polymerization centers during the initial pressuring up period with propylene. This causes chain termination with the formation of olefins which may be copolymerized giving rise to low molecular weight polymers which are sticky or tacky. The tacky polymer thus formed adhered to the inner surfaces of the reactor to form the bag of polypropylene. Further, bagging was observed no matter how quickly the initial propylene was admitted. The same effect takes place when there is a large temperature differential between the temperature regulating medium (as represented by heating coils or heating jacket) and the reaction mixture. This is because the initial high temperature, with insufficient propylene within the reactor, produces initiating centers without affording a sufficiently high concentration of propylene to satisfy these centers. If it is assumed that this explanation is correct it will be seen that the elimination of the polypropylene bag requires that sufficient propylene be supplied to the polymerization initiating centers and/or the centers not be formed. These theoretical considerations are amply borne out by a series of experiments whereby bagging is entirely eliminated by controlling the factors described above. Based on the above considerations it will be seen that the resolution of the bagging problem does not rely upon such factors as the nature of the specific catalyst, the specific polymerization temperature, the nature of the solvents, the presence of impurities and similar considerations which are known to be factors which effect the overall low pressure polymerization of alpha-olefins.

In conducting the improved processes of this invention the alpha-olefin may be charged to the reactor in either the gaseous or liquid state. This is because the olefin becomes sufficiently dispersed, in either case, before bagging can occur.

The temperature differential within the reactor, as indicated above, should be less than 20° C. and in the preferred embodiment the temperature differential is less than 10° C. In this way greater assurance is afforded that the bag will not be formed. At temperature differentials slightly in excess of 15° C. the bag may form but it will not be severe. At temperature differentials between 15 and 20° C. the bag becomes more pronounced, particularly on the heat exchange surfaces so that heat transfer becomes inefficient.

The improvements of the present invention are preferably applied to catalysts of the aluminum alkyl-transition metal halide type. Among the aluminum alkyls there may be mentioned aluminum diethyl chloride, aluminum triethyl, aluminum triisobutyl, aluminum triisopropyl, aluminum diethyl bromide and the like. The transition metal halides are selected from metals within groups IV to VI of the periodic table and particularly preferred are titanium trichloride or zirconium trichloride. The preferred temperatures for conducting the polymerization, excluding the temperatures during the initial heating period, ranges from about 35–100° C. with the polymerization being conducted in any inert solvent such as octane, isooctane, heptane, toluene and the like. The preferred catalyst and polymerization temperatures are those which are known in the prior art to be most suitable because the rates of polymerization and the product has a high portion of crystallinity. In addition the product has other desirable characteristics such as molecular weight, and the like. In considering the quantity of the catalyst components to be employed in preparing the catalyst, it is preferred that the molar ratio of the aluminum compound to the metal halide be in the order of 2.5:1. However, all that is actually required is that the aluminum compound be present in molar excess from about 1.05:1. The upper limit may be as high as 10:1, or even higher, but in actual practice such a large molar excess of aluminum compound is not needed and should not be employed because of the disadvantages which result. Thus with large excess of catalyst waste results because the excess serves no useful purpose. Further, the separation of the catalyst residues from the polymer becomes more troublesome.

In conducting the processes of this invention as well as in conducting the low pressure polymerizations in general, it is preferred that the solvent, catalyst and monomer be free of harmful impurities such as oxygen, compounds containing active oxygen and sulfur, unsaturated hydrocarbons other than the monomer to be polymerized, and the like.

It will be understood that this invention is in no way limited by the employment of numerous other techniques which have been described for the polymerization of propylene by the low pressure methods. Thus, for example, if desired, the polymer after the polymerization is complete, may be worked-up by any conventional procedure such as washing the polymer with a lower alcohol or with acidified lower alcohols. Thereafter the polymer is filtered, washed and dried and is ready for use. If desired the polymer may be treated to reduce air oxidation, or to color the polymer with dyes or pigments or to impart to the polymer various physical properties which results from the inclusion of such materials as extenders, fillers, plasticizers, and the like. Modifications of this type and others which are employed in low pressure polymerizations, such as suspending the catalyst on an inert carrier, may be employed without departing from the spirit of this invention which is described in greater detail in the following examples.

*Example I*

To a reactor equipped with an agitator, heating coils, an inlet and outlet for circulating an inert gas and a feed inlet, is charged 3,000 mls. of heptane. Aluminum triethyl is charged to the solvent under an inert atmosphere in an amount sufficient to provide an aluminum:titanium mole ratio of 2.5:1. Then with constant agitation titanium trichloride is added to the reactor to provide one gram per 3 liters of heptane. The inert gas is then removed from the system by evacuation and then the reactor is filled with propylene to 20 p.s.i.g. at room temperature. The temperature of the contents of the reactor is slowly raised so that the temperature differential between the contents of the reactor and the heating medium being circulated in the heating coils does not exceed 10° C. When the temperature of the heating medium reaches 85° C. the heat source is controlled until the temperature of the reactants within the reactor and the temperature of the heating medium are 85° C. Thereafter additional propylene is pressured into the vessel at 80 p.s.i.g. and maintained at this temperature and pressure during the course of the reaction. After about six hours the excess propylene is vented and the contents of the reactor are cooled and filtered. The polymer is washed with ethyl alcohol which is acidified with hydrochloric acid. Thereafter the polymer is washed with water containing a small amount of sodium carbonate followed by another water washing and then dried. There is obtained 315 grams of polymer 89% of which is insoluble in boiling isooctane. The polymer has an intrinsic viscosity of 5.1 and a density of 0.907. The reactor contains no polymer adhering to the agitator, heating coil, or walls of the reactor. It is observed that the polymerization is constantly in a homogeneous suspension throughout the reaction.

*Example II*

This example illustrates the procedure wherein bagging is obtained.

The procedure of Example I is repeated except that the contents of the reactor is raised to the reaction temperature of 85° C. in a short time with temperature differentials of greater than 15° C. between the reaction mixture and heat exchange medium. In this case the polymer which is recovered has substantially the same intrinsic viscosity and density as that obtained in Example I but the bagging is pronounced.

Example III

This example illustrates another procedure wherein severe bagging is obtained.

The procedure of Example I is repeated except that in this case the solvent and catalyst are first heated to 85° C. so that the temperature differential is maintained at about 10° C. maximum during the heating period. The propylene is pressured to the reactor when the reaction temperature of 85° C. is reached. As in the above examples the polymer which is recovered has about the same physical properties as the polymer in Example I but in this example bagging is severe.

Example IV

The procedure of Example I is repeated except that equimolar amounts of titanium tribromide and aluminum diethyl chloride are employed as the catalyst and the polymerization temperature is 75° C. In this case no bagging is obtained.

In a companion experiment the same procedure is repeated except that the temperature is permitted to rise rapidly to the reaction temperature of 75° C. In the companion experiment severe bagging is encountered.

Example V

The procedure of Example I is repeated using equimolar amounts of titanium trichloride and aluminum triisobutyl with the polymerization temperature being 65° C. No bagging is found to have occurred. In a companion experiment the procedure of Example III is repeated with the temperature differential being maintained at a maximum of 10° C. The propylene is pressured to the reactor when the contents of the reactor reaches the polymerization temperature of 65° C. At the termination of the polymerization severe bagging is found to have occurred. The procedure of Example I is repeated except that the temperature differential is permitted to obtain a maximum of 15° C. After the reaction is completed it is observed that only very slight bagging had occurred which is represented by the presence of small amounts of polymer adhering to the heating coils.

Example VI

The procedure of Example I is repeated except that the polymerization temperature is 45° C. In this case no bagging occurs.

Example VII

The procedure of Example I is repeated except that equivalent amounts of magnesium ethyl replaces the aluminum triethyl. As in Example I no bagging occurs.

Example VIII

The procedure of Example I is repeated for the polymerization of ethylene. In this example titanium tetrachloride and aluminum diethyl chloride are used to prepare the catalysts in an amount to give an Al:Ti ratio of 2.5:1. The reactor, upon completion of the reaction, is free of adhering polymer.

Example IX

The procedure of Example I is repeated using a catalyst system of aluminum trioctyl and zirconium trichloride. As in Example I, no bagging is encountered.

In another series of experiments the catalyst ratios are varied so that the Al:Ti molar ratios range from in excess of 5:1 to as low as 1:1. In all cases where the procedures are conducted in accordance with the present invention bagging was not observed, whereas similar experiments using prior art methods of procedure always produced bagging. As a generalization it appears that bagging is slightly less severe when the polymerization temperatures are lower. This may be accounted for by the presence of fewer initiating centers which remain unsatisfied.

From the foregoing it will be appreciated that this invention is capable of numerous modifications. Thus, if desired, the catalyst may be supported on an inert carrier in which event the work up procedure may require modification. Still other modifications may be adopted without departing from the spirit of the invention.

We claim as our invention:

1. In the process for the polymerization of alpha-mono olefins at a temperature between 35–100° C. and pressures below about 500 p.s.i.g. in the presence of a catalyst consisting essentially of a reaction product of aluminum alkyl and a group IV transition metal halide, the improvement which comprises filling a reactor with solvent, catalyst and sufficient alpha-mono olefin monomer to saturate the reaction mixture with said monomer, the reactants being introduced into the reactor while at a temperature less than the polymerization temperature, and thereafter slowly applying external heat to the reaction mixture to a reaction temperature while maintaining the temperature differential between the reaction mixture and the external heating means at less than 10° C. while maintaining the reactor essentially saturated with said monomer.

2. The process of claim 1 in which the catalyst is an aluminum alkyl-titanium halide reaction product.

3. The process of claim 1 in which the catalyst is an aluminum dialkyl halide-titanium halide reaction product.

4. The process of claim 1 in which the catalyst is aluminum diethyl chloride-titanium trichloride reaction product.

5. The process of claim 1 in which the catalyst is aluminum triethyl-titanium trichloride reaction product.

6. In the process for the polymerization of propylene at a temperature between 35 and 100° C. and a pressure below about 500 p.s.i.g. in the presence of a catalyst consisting essentially of the reaction product of an aluminum alkyl and a group IV transition metal halide, the improvement which comprises filling a reactor with solvent, catalyst, and sufficient propylene to saturate the reaction mixture with propylene, the reactants being introduced into the reactor while at a temperature less than the polymerization temperature, and thereafter slowly applying external heat to the reaction mixture to a reaction temperature while maintaining the temperature differential between the reaction mixture and the external heating means at less than 10° C. while maintaining the reactor essentially saturated with said propylene.

7. The process of claim 6 in which the catalyst is aluminum diethyl chloride-titanium trichloride reaction product.

8. The process of claim 6 in which the catalyst is aluminum triethyl-titanium trichloride reaction product.

9. The process of claim 6 in which the catalyst is aluminum triisobutyl-titanium trichloride reaction product.

10. The process of claim 6 in which the catalyst is aluminum trioctyl-zirconium trichloride reaction product.

References Cited in the file of this patent

FOREIGN PATENTS

| | | |
|---|---|---|
| 533,362 | Belgium | May 16, 1955 |
| 538,782 | Belgium | Dec. 6, 1955 |